US011892131B2

(12) United States Patent
Strechay et al.

(10) Patent No.: US 11,892,131 B2
(45) Date of Patent: Feb. 6, 2024

(54) BATTERY SWAP FLASHLIGHT

(71) Applicants: Lauren E. Strechay, Hopkinton, MA (US); Brianna Nicolette Buonora, Hopkinton, MA (US)

(72) Inventors: Lauren E. Strechay, Hopkinton, MA (US); Brianna Nicolette Buonora, Hopkinton, MA (US)

( * ) Notice: Subject to any disclaimer, the term of this patent is extended or adjusted under 35 U.S.C. 154(b) by 0 days.

(21) Appl. No.: 18/079,111

(22) Filed: Dec. 12, 2022

(65) Prior Publication Data

US 2023/0184396 A1 Jun. 15, 2023

Related U.S. Application Data

(60) Provisional application No. 63/288,900, filed on Dec. 13, 2021.

(51) Int. Cl.

| | |
|---|---|
| ***F21L 4/00*** | (2006.01) |
| ***F21V 17/06*** | (2006.01) |
| ***F21V 23/04*** | (2006.01) |
| *F21Y 115/10* | (2016.01) |

(52) U.S. Cl.
CPC .............. *F21L 4/005* (2013.01); *F21V 17/06* (2013.01); *F21V 23/0414* (2013.01); *F21Y 2115/10* (2016.08)

(58) Field of Classification Search
CPC ....... F21V 23/0414; F21V 17/06; F21L 4/005
See application file for complete search history.

(56) References Cited

U.S. PATENT DOCUMENTS

| | | | | |
|---|---|---|---|---|
| 5,272,606 A * | 12/1993 | Blaney | F21L 2/00 | 362/208 |
| 2005/0225969 A1* | 10/2005 | Chen | F21L 4/085 | 362/157 |
| 2009/0040752 A1* | 2/2009 | Dallas | H01M 50/267 | 362/202 |

* cited by examiner

*Primary Examiner* — Evan P Dzierzynski
*Assistant Examiner* — Nathaniel J Lee
(74) *Attorney, Agent, or Firm* — Clark Hill PLC; John S. Paniaguas

(57) ABSTRACT

An improved flashlight is disclosed. The flashlight includes first and second selectable power sources, housed in a common battery housing. The flashlight enables power to the flashlight to be switched to a second battery when the first battery fails by way of a switch on the exterior of the battery housing.

13 Claims, 7 Drawing Sheets

BATTERY SWAP FLASHLIGHT

CROSS REFERENCE TO RELATED APPLICATIONS

This application claims priority to and the benefit of U.S. Provisional Patent Application No. 63/288,900, filed on Dec. 13, 2021, hereby incorporated by reference.

BACKGROUND OF THE INVENTION

1. Field of the Invention

The present invention relates to an improved flashlight that includes a first power source and a second power source housed in a common housing. The flashlight is configured so that power to the flashlight can be switched to the second power source when the first power source fails by way of a selector switch on the exterior of the battery housing.

2. Description of the Prior Art

Flashlights are vital tools in various industries. For example, plumbers electricians, to name a few. Plumbers need flashlights in order see into dark places, such as under sinks. Electricians deed flashlights to see into electrical cabinets. Police are also known to use flashlight to see the inside a vehicle and its occupants during night-time traffic stops.

There are several problems with conventional flashlights. Without a battery tester, there is no way of knowing that flashlight batteries are going bad will soon need to be replaced. Moreover, flashlight batteries can fail at unsuspecting times. However, battery replacement is not always possible at the time and location of the failure. If a backup flashlight is not readily available, the user, such as a policeman on a night-time traffic stop, for example, can be placed in a precarious if not dangerous situation.

SUMMARY OF THE INVENTION

The present invention relates to a flashlight with a backup battery, housed in the battery housing, that enables power to the flashlight to be switched to the backup battery when the primary battery fails by way of a switch on the exterior of the battery housing. Thus, power can be immediately restored to the flashlight with no manual intervention other than actuating a switch on the exterior of the flashlight housing. Such a configuration allows the failed primary battery to be replaced at a convenient time and place.

DESCRIPTION OF THE DRAWING

These and other advantages of the present invention will be readily understood with reference to the following specification and attached drawing wherein.

DETAILED DESCRIPTION

The present invention relates to a flashlight with a backup battery, housed in the battery housing, that enables power to the flashlight to be switched to a second or backup battery when the first or primary battery fails by way of a switch on the exterior of the battery housing. Thus, power can be immediately restored to the flashlight with no manual intervention other than actuating a switch on the exterior of the flashlight housing. Such a configuration allows the failed primary battery to be replaced at a convenient time and place.

Figure 1:
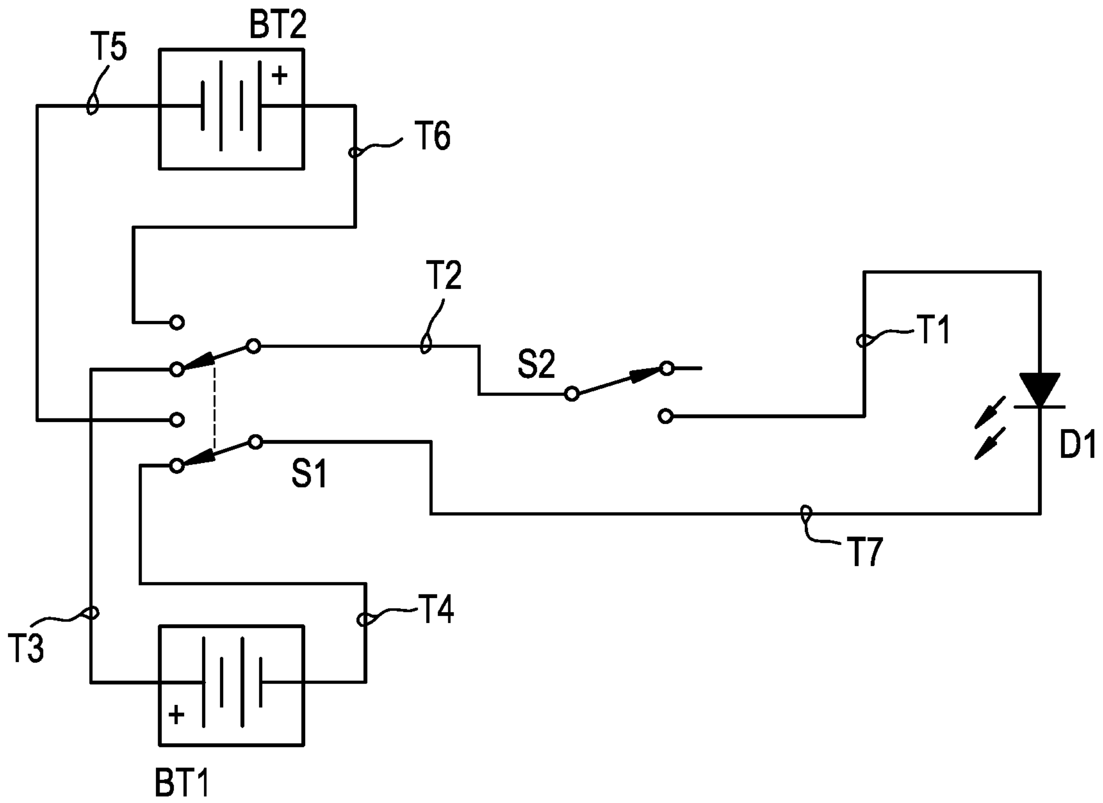
FIG. 1 is an electrical schematic diagram of the battery swap flashlight.

An exemplary schematic for the battery swap flashlight is illustrates in FIG. 1. As shown, the flashlight includes two power sources BT1 and BT2. BT1 may be considered the first or primary power source and BT2 is the second or backup power source. A double pole single throw switch S1 is used to alternatively couple the power sources BT1 and BT2 to the light emitting diode (LED) D1. A on-off switch S2 is used to turn the flashlight on and off and connect the selected power source to the LED. The switch S2 is a single pole double throw switch. The switch S2 is shown in an off position. When the switch S2 is turned on, one of the power sources BT1 and BT2 will be connected to a light emitting diode D1. When S1 is in the on position, shown in FIG. 1, the positive terminal of the power source BT1 is connected to the anode of the LED D1 and the negative terminal of the power source BT1 is connected to the cathode, thus forward biasing the diode D1 forward biasing the LED causing it to illuminate.

In the event the power source BT1 fails, the switch S1 may be depressed to disconnect the power source BT1 from the diode D1 and connect the power source BT2 to the diode D1. In this mode, the positive terminal of the power source BT2 is connected to the anode of the diode D1 and the negative terminal of the power source BT2 to the cathode, thus forward biasing the diode D1, causing it to illuminate. As such, a failure of one of the power sources BT1 and BT2 does not result in a loss of function of the flashlight thus allowing the failed power source to be replaced immediately at a convenient time and location.

Figure 2:
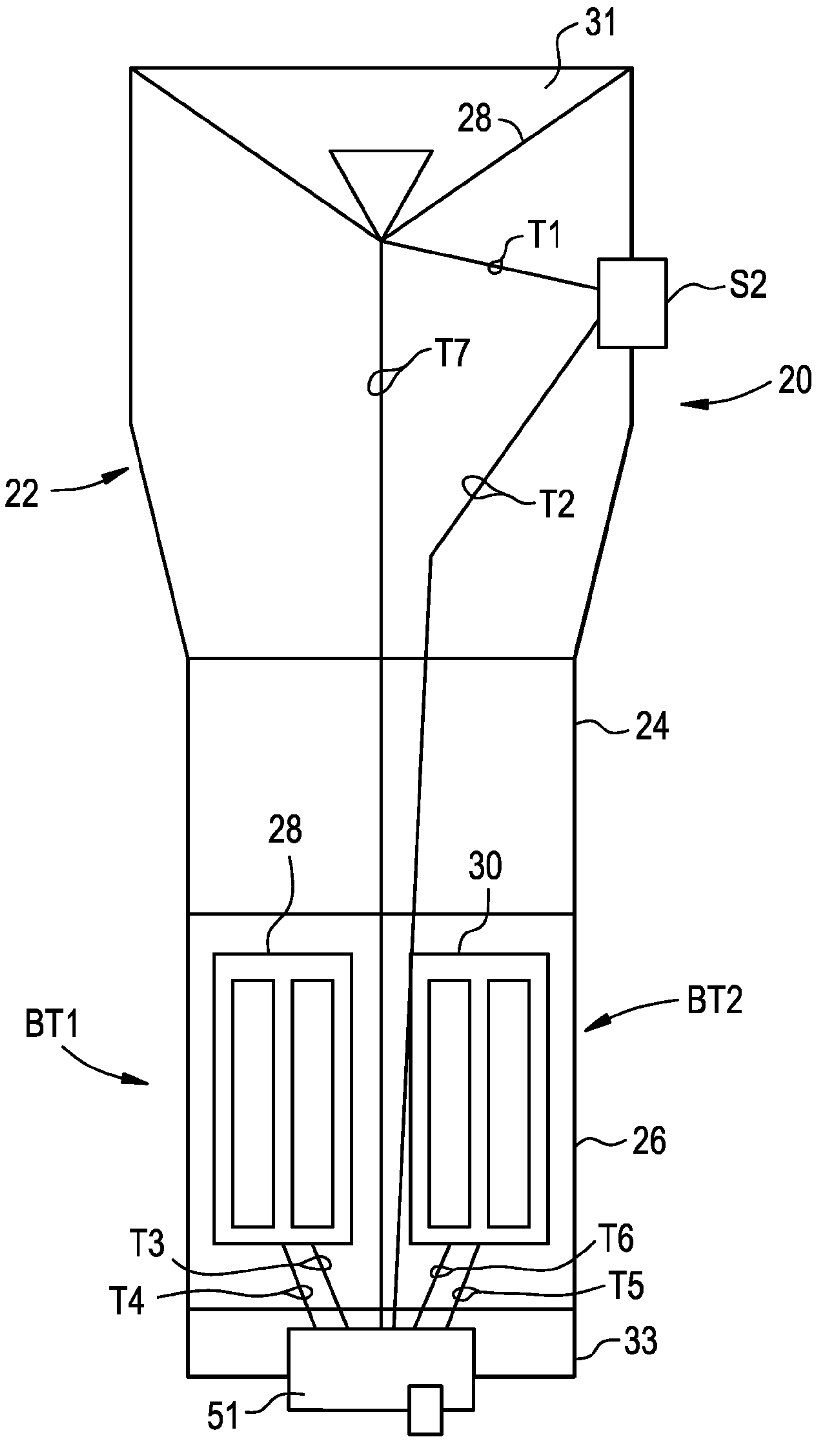
FIG. 2 is an exemplary configuration of the battery swap flashlight illustrated in FIG. 1.

FIG. 2 illustrates an exemplary configuration of the battery swap flashlight in accordance with the invention. As shown, an exemplary housing, generally identified with the reference numeral 20, includes a head portion 22, a body portion 24 and battery compartment section 26. The LED D1 is located in a conical reflector 28, disposed in an open end 27 of the head portion 22 to disperse light outwardly from the LED D1. A protective cover may be used to cover 31 the conical reflector 28 forming an assembly to protect the LED D1 from damage.

The head portion 22 is coupled to a body portion 24, which, in turn, is connected to the battery compartment portion 26. The battery compartment portion 26 includes a pair of battery holders 28 and 30. Each battery holder 28 and 30 is used to connect one of the power sources BT1 and BT2 to the circuit.

Each battery holder 28, 30 is configured to connect 2 batteries in series to the circuit. Two AA battery cells are shown in FIG. 2 for illustration to form the power sources BT1 and BT2. However, type AAA, C, and D battery cells are also suitable for use with the invention as well as rechargeable batteries. Each battery cell provides a nominal voltage of 1.5 volts DC. Thus, the batter holders 28 and 3*o* connect two batteries in series to provide a nominal 3.0 volts DC. This 3.0 DC voltage is required to enable the diode D1 to turn when it is forward biased.

FIG. 2 also illustrates the wiring for the circuit. The wiring between components is indicated by the references T1-T7. As shown, the battery compartment portion 28 is connected to the switch S1 by way of T3 and T4. Similarly, the battery compartment portion 30 is connected to switch S1 by way of T5 and T6. Lastly, the LED is connected to switch S1 by way of T7.

As will be discussed in more detail below, one end 32 of the battery compartment portion 26 of the housing 20 is open. It is closed by a battery compartment lid portion 33. The switch S1 is carried by the battery compartment lid portion 33. As shown, there are multiple wiring connections T1, T2, T3, T4, T5 and T6 between the battery compartment lid portion 33 and other components in the circuit. With reference to FIGS. 1 and 2, there is also one connection T1 between switch S2 and the LED. The switch S2 is also connected switch S1 by way of T2.

Figure 3:
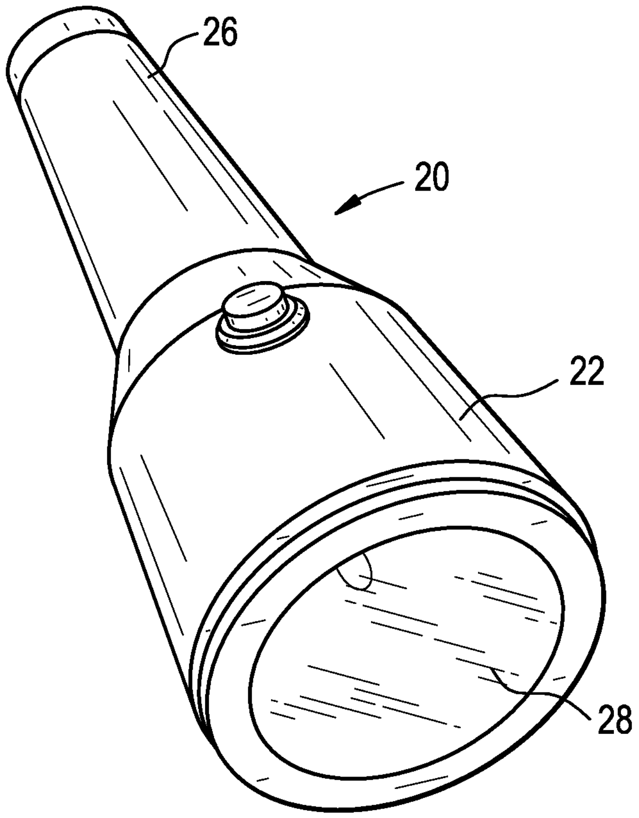
FIG. 3 is an isometric view of an exemplary embodiment of the battery swap flashlight in accordance with the present invention illustrating a front view of the battery swap flashlight.
Figure 4:
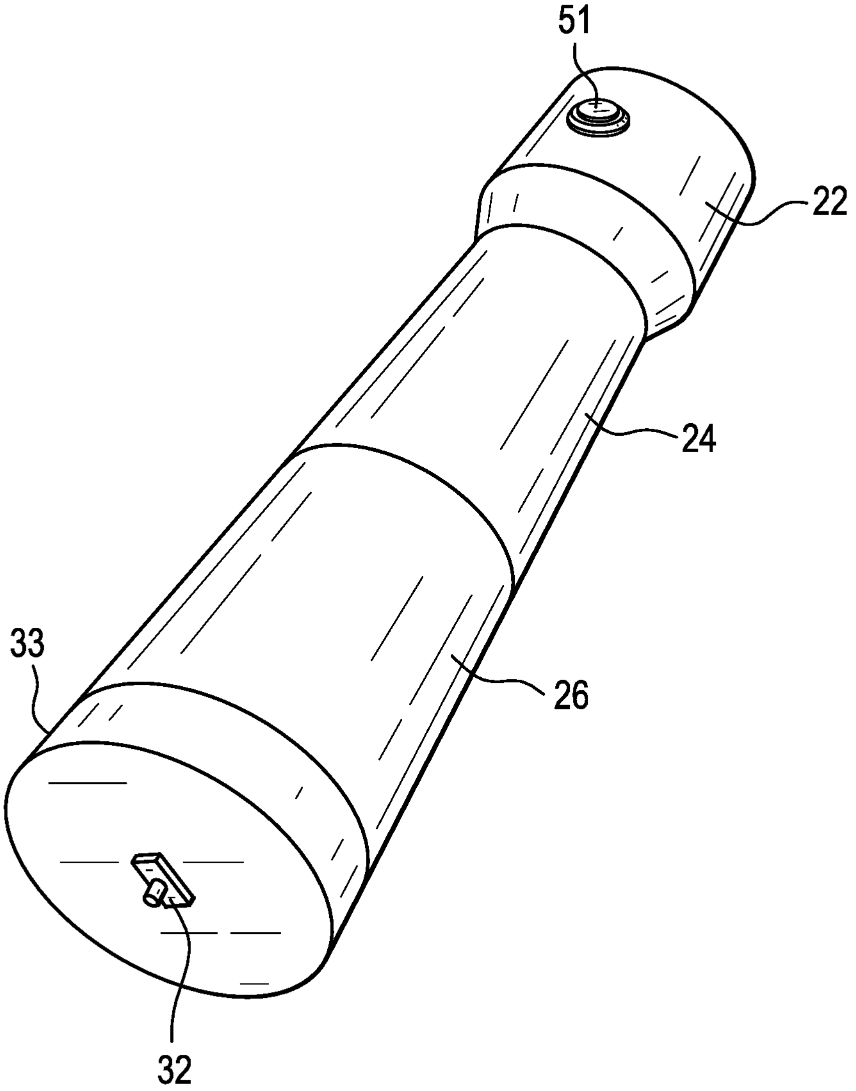
FIG. 4 is similar to FIG. 3 but illustrating a rear view of the battery swap flashlight.
Figure 5A:
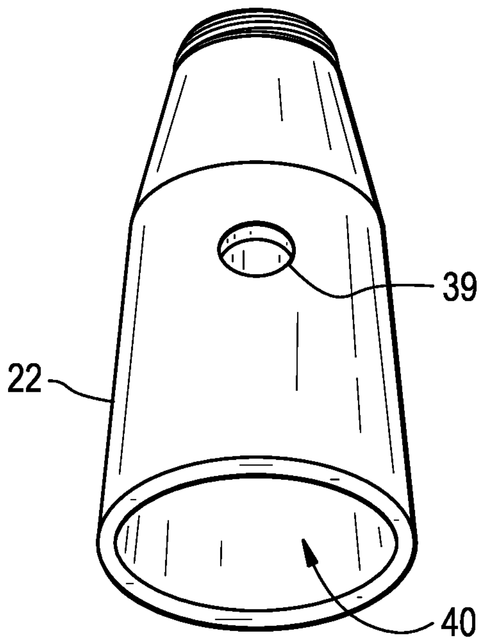
FIG. 5A is an isometric view of a head portion of the battery swap flashlight illustrated in FIGS. 3 and 4.
Figure 5B:
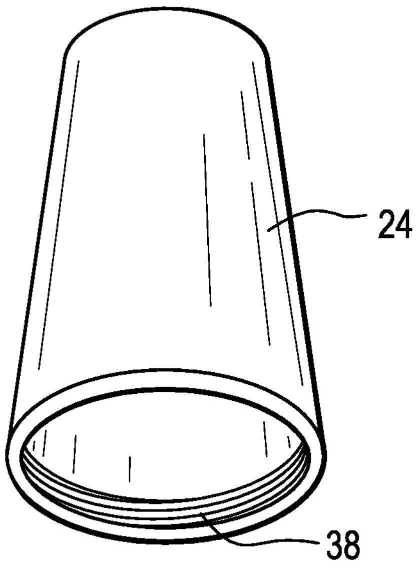
FIG. 5B is an isometric view of a body portion of the battery swap flashlight illustrated in FIGS. 3 and 4.
Figure 5C:
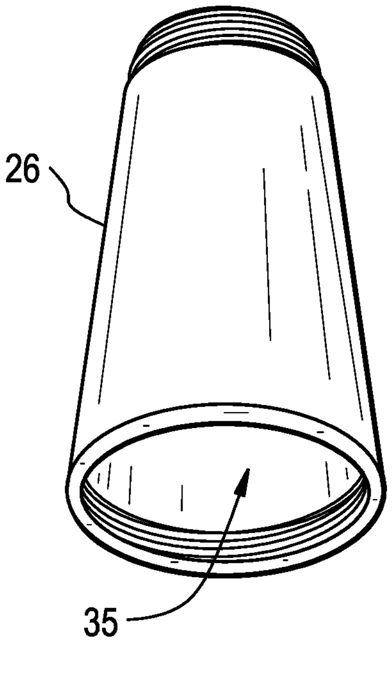
FIG. 5C is an isometric view of a body portion of the battery swap flashlight illustrated in FIGS. 3 and 4.
Figure 5D:
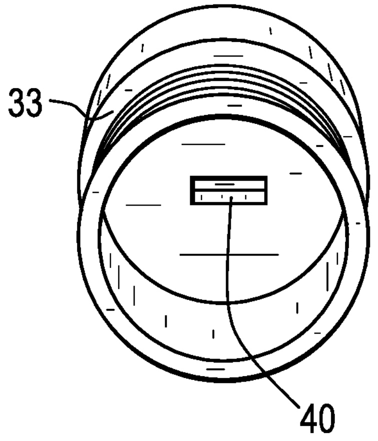
FIG. 5D is an isometric view of the lid portion of the battery swap flashlight illustrated in FIGS. 3 and 4.
Figure 5E:
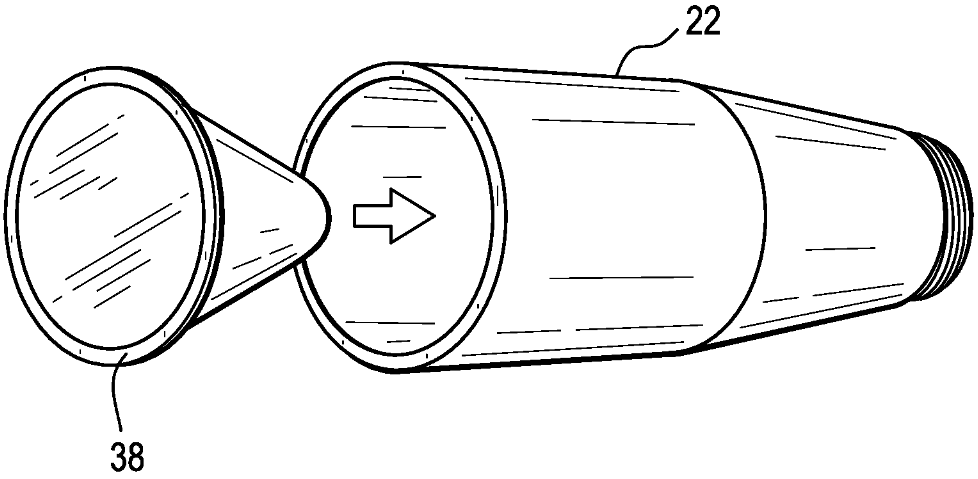
FIG. 5E is an exploded isometric view of reflector removed from the body portion of the battery swap flashlight illustrated in FIGS. 3 and 4.
Figure 5F:
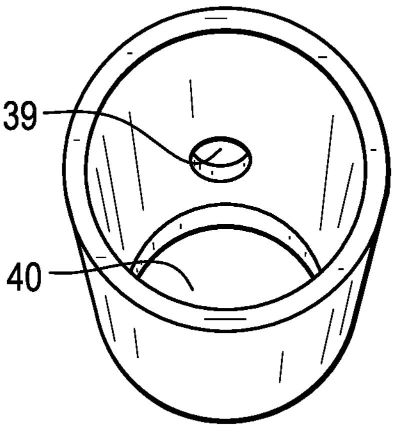
FIG. 5F illustrates the inside of the head portion illustrated in FIG. 5A.
Figure 5G:
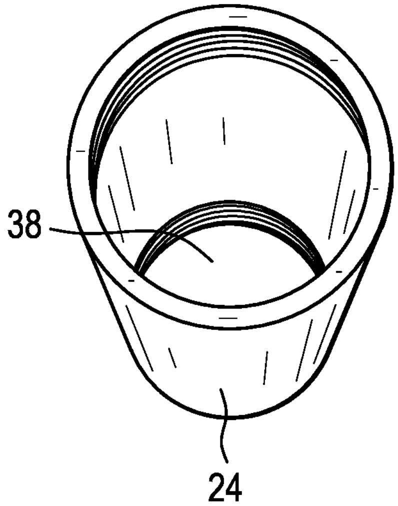
FIG. 5G illustrates the inside of the body head illustrated in FIG. 5B.
Figure 5H:
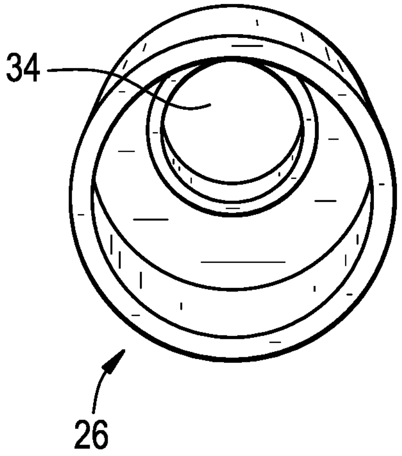
FIG. 5H illustrates the inside of the battery compartment illustrated in FIG. 5C
Figure 5I:
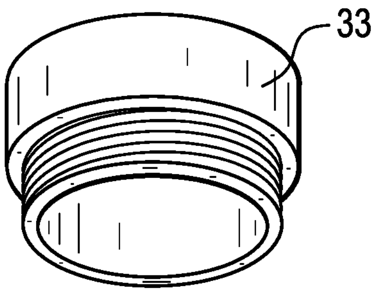
FIG. 5I illustrates is an isometric view of the side of the lid portion illustrated in FIG. 5D.
Figure 5J:
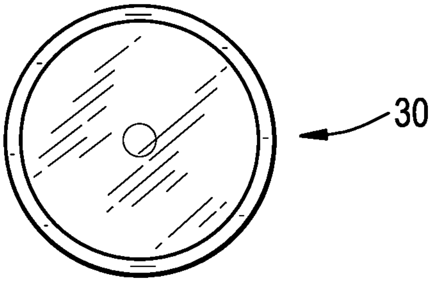
FIG. 5J is a front view of the reflector illustrated in FIG. 5E.

FIGS. 3 and 4 illustrate exemplary embodiments of the housing. As shown, the switch S2 may be carried on the exterior of the head portion. The switch S1 may be carried on battery compartment lid portion 33. Other locations of the switches S1 and S2 are also contemplated.

FIGS. 5A-5I illustrate how all of the components of the housing 20 are interconnected. As shown, the battery compartment portion 26 is formed as a cylindrical member with exterior threads on one end 35. The body portion 24 is also formed as cylindrical member with exterior threads 36 on one end to enable connection to interior threads 38 on one end of the body portion 24. One end 40 of the head portion 22 is formed with a slightly larger diameter than the outer diameter of the body portion 24 to enable a friction fit with the body portion 24. The head portion 22 is formed with an aperture 39 to receive the switch S2. The head portion 20 is threaded on one end to receive a threaded reflector 38 and protective cover 30 assembly. The battery compartment lid 33 closes the opening on one end 35 of the battery compartment 26 and is connected thereto by way of a friction fit. The battery compartment lid 33 includes an aperture 40 to receiving the switch S1.

Obviously, many modifications and variations of the present invention are possible in light of the above teachings. Thus, it is to be understood that, within the scope of the appended claims, the invention may be practiced otherwise than as specifically described above.

We claim:

1. A flashlight comprising:

a first power source;

a second power source;

an LED;

a circuit which includes a double pole single throw selector switch for alternatively connecting said first power source to said LED and disconnecting said second power source from the circuit in a first position or alternatively connecting said second power source to said LED and disconnecting said first power source from said circuit in a second position defining a selected power source;

an on-off switch for connecting and disconnecting said selected power source to said LED; and a housing for carrying said first power source, said second power source, said selector switch, said on-off switch and said LED.

2. The flashlight as recited in claim 1, wherein said housing is hollow cylindrical member open on both ends, wherein one end is closed by a head portion and the other end is closed by a lid portion.

3. The flashlight as recited in claim 1, wherein said lid portion carries said selector switch.

4. The flashlight as recited in claim 1, wherein said head portion is configured to receive a reflector and a protective cover.

5. The flashlight as recited in claim 1, wherein said head portion is configured to carry said on-off switch and said LED.

6. The flashlight as recited in claim 1, wherein said first and second power sources are batteries.

7. The flashlight as recited in claim 6, further including battery holders for carrying said batteries.

8. The flashlight as recited in claim 6, wherein said first and second power sources each include two batteries connected in series.

9. The flashlight as recited in claim 6, wherein said first and second power sources each include two AA batteries.

10. The flashlight as recited in claim 6, wherein said first and second power sources each include two AAA batteries connected in series.

11. The flashlight as recited in claim 6, wherein said first and second power sources each include two C batteries.

12. The flashlight as recited in claim 6, wherein said first and second power sources each include two D batteries.

13. The flashlight as recited in claim 6, wherein one of said first and second power sources are rechargeable batteries.

* * * * *